US007126966B2

(12) United States Patent
Jokinen et al.

(10) Patent No.: US 7,126,966 B2
(45) Date of Patent: *Oct. 24, 2006

(54) METHOD FOR IDENTIFYING BASE STATIONS OF A TIME DIVISION CELLULAR NETWORK IN A MOBILE STATION AND MOBILE STATION

(75) Inventors: Harri Jokinen, Hiisi (FI); Pekka Ranta, Nummela (FI)

(73) Assignee: Nokia Mobile Phones, LTD, Espoo (FI)

( * ) Notice: Subject to any disclaimer, the term of this patent is extended or adjusted under 35 U.S.C. 154(b) by 798 days.

This patent is subject to a terminal disclaimer.

(21) Appl. No.: 10/247,206

(22) Filed: Sep. 19, 2002

(65) Prior Publication Data

US 2003/0026242 A1 Feb. 6, 2003

(51) Int. Cl.
*H04J 3/06* (2006.01)

(52) U.S. Cl. .................. 370/509; 370/350; 370/503; 370/337

(58) Field of Classification Search ............ None
See application file for complete search history.

(56) References Cited

U.S. PATENT DOCUMENTS

| | | | |
|---|---|---|---|
| 5,128,925 A * | 7/1992 | Dornstetter et al. | 370/336 |
| 5,353,332 A | 10/1994 | Raith et al. | |
| 5,449,386 A | 9/1995 | Denis et al. | |
| 5,673,307 A | 9/1997 | Holland et al. | |
| 5,708,969 A * | 1/1998 | Kotzin et al. | 455/423 |
| 5,809,421 A * | 9/1998 | Manssen et al. | 455/434 |
| 5,839,070 A | 11/1998 | Lupien et al. | |
| 5,903,804 A | 5/1999 | Kirkpatrick et al. | |
| 7,024,194 B1 * | 4/2006 | Oksanen | 455/437 |
| 2001/0024482 A1 * | 9/2001 | Tiedemann et al. | 375/354 |
| 2004/0095953 A1 * | 5/2004 | Bellier et al. | 370/442 |

FOREIGN PATENT DOCUMENTS

| | | |
|---|---|---|
| EP | 0 892 571 A2 | 1/1999 |
| WO | WO 96/21987 A2 | 7/1996 |
| WO | WO 96/21987 A3 | 7/1996 |

OTHER PUBLICATIONS

"The GSM System For Mobile Communications", Aug. 1993, pp. 308-430.

* cited by examiner

*Primary Examiner*—Doris H To
*Assistant Examiner*—Thien D. Tran
(74) *Attorney, Agent, or Firm*—Perman & Green, LLP

(57) ABSTRACT

The invention relates to a method for identifying base stations of a time division cellular network in a mobile station. An object of the invention is to speed up the identification of new base stations. In accordance with the invention
frame timing difference data for the neighbor base stations (301) and/or the broadcast control channel time slot data for the neighbor base stations are transmitted from the serving base station to the mobile station;
reception times for the neighbor base stations' system data are determined in the mobile station on the basis of said frame timing differences and/or the broadcast control channel time slot data (302) and
system data are read and neighbor base stations are identified (303). The invention is also directed to a mobile station applying the method.

3 Claims, 9 Drawing Sheets

METHOD FOR IDENTIFYING BASE STATIONS OF A TIME DIVISION CELLULAR NETWORK IN A MOBILE STATION AND MOBILE STATION

The invention relates to a method, as defined in the preamble of claim 1, for identifying base stations of a time division cellular network in a mobile station.

The invention also relates to a method, as defined in the preamble of claim 7, for identifying base stations of time division cellular network in a mobile station.

The invention further relates to mobile stations according to the preambles of claims 10 and 11.

As regards base station identification the GSM cellular network in its present state operates as follows. A neighbour list is defined for each cell in the GSM network, containing the frequencies of the broadcast control channels (BCCH) of the base stations to which the mobile station can move on next. The mobile station measures field strengths at frequencies determined by the base station broadcast control channel BCCH, averages each of them and, based on the results, compiles a list of six strongest neighbour base stations. An attempt is made to decode the identification codes of the six strongest neighbours and the levels and identification codes of those base stations the identification codes of which have been decoded are reported to the network. The network uses the information to make a handover decision.

In a cellular network, the frequencies are re-used, i.e. each particular frequency is used simultaneously by several cells. Therefore, when measuring field strengths a mobile station periodically reads the base station identification code (BSIC) transmitted on the synchronisation channel (SCH) by the base station measured. Base stations using the same broadcast control channel BCCH frequency have different BSICs. When the BSIC is found, it tells the mobile station whether the base station in question is a neighbour base station or some other base station transmitting from farther away. This is why the BSICs are read. If a BSIC cannot be re-confirmed within a certain time period or if an incorrect BSIC is detected, the current field strength measurement related to the frequency in question will be discarded.

One time period, so-called IDLE frame, which is a little longer than a time division multiple access (TDMA) frame, is reserved in the mobile station's traffic channel (TCH) multiframe for the reading of BSICs. During that frame, one TDMA frame can be read from data coming from a base station. The BSIC appears in the base station's BCCH/CCCH multiframes every 10 or 11 TDMA frames (CCCH=common control channel). The BCCH/CCCH multiframe consists of 51 TDMA frames. The IDLE frame, in turn, is repeated every 26 TDMA frames. Thus, the IDLE frame "slips" on the BCCH/CCCH multiframe for one TDMA frame per BCCH/CCCH multiframe cycle. When looking for a BSIC related to a certain BCCH frequency, it is first read the FCCH burst in the frequency correction channel (FCCH) frame of the BCCH/CCCH multiframe and then the BSIC in the following SCH frame. In the best case, the FCCH frame coincides with the IDLE frame immediately and in the worst case, only after 11 IDLE frames. So, the BSIC is detected during 2 to 13 TCH multiframes, on average after about 7 multiframes, i.e. in 0.8 seconds, approximately.

The problem with the operation described above is the relatively long time it takes to identify new base stations and in particular to find the BSICs. Therefore, especially a fast-moving mobile station may fail to monitor the neighbour base stations in a small-cell network, in other words, the handover may sometimes fail. New base stations (frequencies) appear on the neighbour list of a mobile station always after a handover, and even when moving within a single cell the list of the six strongest neighbours may be modified quite often. Furthermore, the traffic channel of a cell is often heard on the list of the six strongest neighbours and since the mobile station does not know whether a signal is from a traffic channel or a neighbour from the BCCH multiframe, the IDLE frames used for the search for the FCCH frame at this particular frequency are wasted. The slowness of identification of new base stations is caused by the read procedure used and by the fact that the base stations are not synchronised with each other.

The mobile station tries to recognise the identification codes of the six strongest base stations as quickly as possible and at the same time the identification codes at the frequencies of already-identified base stations have to be regularly re-confirmed. Re-checks are necessary as otherwise noise frequencies may cause errors in the field strength figures. The reading of an old BSIC does not take much time as such because the mobile station knows the IDLE frame during which an already-detected BSIC can be re-read. The problem is that the greater part of the time, i.e. IDLE frames available, is used searching for the BSICs of new base stations.

An object of the invention is to provide a new method for identifying base stations of a time division cellular network in a mobile station and to eliminate the disadvantages described above.

A first method according to the invention is characterised by what is expressed in claim 1. A second parallel method according to the invention is characterised by what is expressed in claim 7. A first and a second mobile station are characterised by what is expressed in claims 10 and 11. Preferred embodiments of the invention are described in the sub-claims.

In a first method according to the invention for identifying base stations of a time division cellular network, data are transferred from the serving base station to the mobile station concerning the frame timing differences of the neighbour base stations, in the mobile station it is determined on the basis of said frame timing differences the system data reception times for the neighbour base stations, and system data are read and neighbour base stations are identified.

In the first method according to the invention, the serving cell, or base station, transmits the frame timing differences of the base stations on the neighbour list to the mobile station. The frame timing differences have been calculated e.g. for a pseudo-synchronous handover. That calculation may be based on mutual base station timing differences measured and reported by the mobile phone. The frame timing difference data are transmitted in the active state preferably on a suitable control channel such as the slow associated control channel SACCH or the fast associated control channel FACCH, and, correspondingly, these data are transmitted in the idle state preferably on the broadcast control channel BCCH or the common control channel CCCH. The frame timing difference data can also be transmitted in some other suitable manner. The mobile station receives the frame timing difference data and uses them to calculate the reception times for the base stations' system data. This means preferably determining the time of occurrence of the IDLE frames that are aligned with the BSICs transmitted by each of the base stations on the neighbour list. These IDLE frames are then used for reading the BSICs. So, here the mobile station does not search for the frequency correction channel FCCH, which search consumes the greatest amount of IDLE frame capacity.

Thus the invention has the advantage that the system data, preferably the identification codes, of the base stations corresponding to the new frequencies on the neighbour list can be read relatively fast.

Additionally the invention has the advantage that more time remains for checking the identification codes of the old base stations on the list since no IDLE frames are wasted searching for the timing/synchronisation data, i.e. FCCH frames, of the new base stations.

Furthermore, the invention has the advantage that when a mobile station is in the idle state, its energy consumption decreases from what it is presently. This is based on the fact that when the frame timing differences are known, less time is consumed monitoring the neighbour cells' system data and the active time of the mobile station thus becomes shorter.

In a second method according to the invention for identifying base stations of a time division cellular network, data are transferred from the serving base station to the mobile station concerning the broadcast control channel time slots used by the neighbour base stations, in mobile stations it is determined on the basis of said broadcast control channel data the system data reception times for the neighbour base stations, and system data are read and a neighbour base station is identified.

The second method according to the invention is applied in a cellular network that uses discontinuous transmission of broadcast control channel BCCH carrier wave. The basic idea in the method is that the mobile station should know the time slots during which the transmission of the broadcast control channel BCCH of a particular neighbour cell is carried out and during which the neighbour cell monitoring and measurements can be performed.

In the present GSM system, each base station's broadcast control channel BCCH carrier wave is continuously transmitted. This facilitates mobile station synchronisation with network as well as field strength measurements of neighbour base stations. On the other hand, a continuously transmitted broadcast control channel BCCH has the disadvantage that traffic channels on this carrier cannot employ discontinuous transmission DTX and power control. Furthermore, it should be noted that even if there were no traffic at all on the broadcast control channel BCCH, a so-called dummy burst must be transmitted all the same. This results in a decrease of capacity as the noise level in the network becomes higher. Bigger than in the GSM system the problem will be in future mobile telephone systems such as the universal mobile telecommunication system UMTS, in which the number of traffic channels on the broadcast control channel BCCH carrier can be considerably larger than in the GSM system (e.g. 64).

In a cellular network employing discontinuous broadcast control channel BCCH carrier, the search for the serving cell and the reliability of monitoring the neighbour base stations will be degraded. This is because carrier discontinuity results in considerable errors in the field strength measurements as a measurement may be carried out at a time when the carrier is not transmitted. One way of alleviating the problem is to lengthen the averaging period of the measurement. This, however, leads to the slowing-down of the search for the serving cell, i.e. presynchronisation, and the monitoring of neighbour base stations, especially when there is only a little traffic on the carrier. However, the problems described above can be solved using the second method according to the invention.

When a mobile station receives from the serving base station on the broadcast control channel BCCH the data about the neighbour base stations as well as the information about the time slots during which a neighbour base station's BCCH carrier wave transmission is active, the mobile station can perform the monitoring and measurement of that neighbour base station. In a preferred embodiment of the invention, the data transmitted from the serving base station include the information about the frame timing differences of the neighbour base stations.

In a preferred embodiment of the invention the reading of system data and the identification of neighbour base stations include the field strength measurements. When the field strength measurement has to be performed asynchronously, i.e. without knowledge of whether the measured time slot is at reference power, it is advantageous according to the invention to improve the reliability of the measurement by having on the carrier a minimum number of time slots at a fixed transmission power, or reference power. The more there are such time slots, the more reliable the measuring information.

In the monitoring of neighbour base stations, the reliability of the field strength measurement (RSSI) is improved if the locations of the carrier reference power time slots in the broadcast control channel BCCH carrier are known. It is advantageous that the reference power time slot locations and frame timing differences with respect to other neighbour base stations are transmitted via the broadcast control channel BCCH of the serving base station. Additionally, if the locations of the broadcast control channel time slots used by the neighbour base stations are hopping because of time or frequency hopping, for example, information will be transmitted also on the hopping sequences of the other base stations.

The invention will now be described in more detail. In the description reference will be made to the accompanying drawing wherein FIGS. 1a and 1b illustrate the search according to the prior art for the identification code of a new base station, wherein FIG. 1a shows a given initial situation and FIG. 1b the situation after six TCH frames;

Figure 1A:
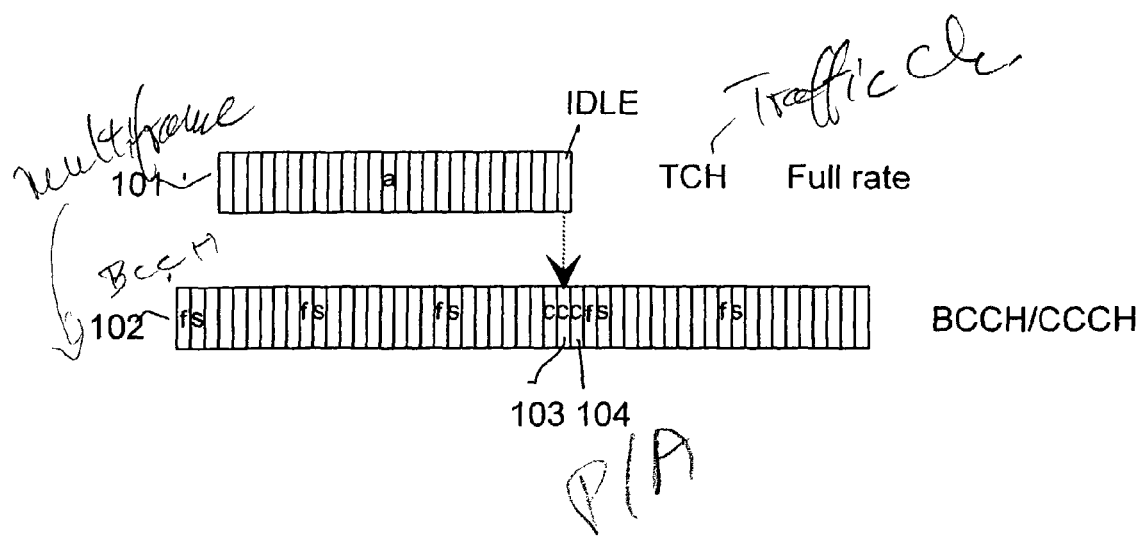
Figure 1B:
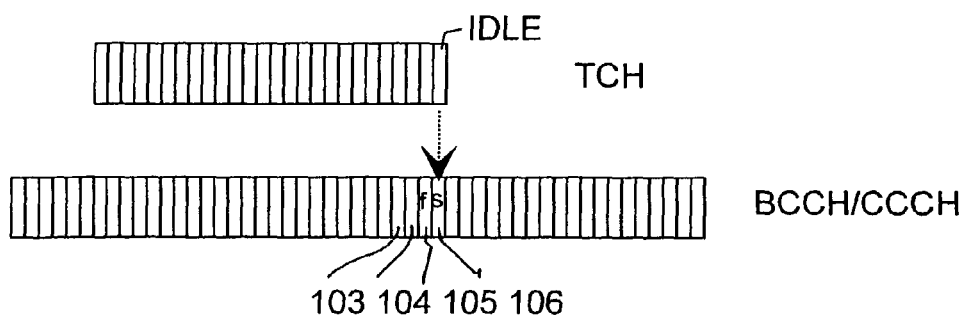

FIGS. 1a and 1b illustrate the current known method for searching for a new base station identification code. In the initial situation a base station sends a neighbour list to a mobile station. The mobile station measures all frequencies on the list and finds e.g. the six strongest of them. When the neighbour list contains a new frequency among the six strongest frequencies, the mobile station will start to search the associated BSIC identification code as soon as it comes to that particular frequency in the base station identification process. A TDMA frame dedicated for this purpose, i.e. the IDLE frame, in the multiframe 101 of the traffic channel TCH is used for the searching. During a single IDLE frame it is possible to check one TDMA frame in the BCCH/CCCH multiframe 102 transmitted by the base station using the frequency in question. As the base stations are not synchronised, the mobile station's IDLE frame may coincide with any part of the base station's BCCH/CCCH multiframe. FIG. 1a assumes that the IDLE frame first coincides with a CCCH-type TDMA frame (cf. dashed line) as regards the time slot in which the synchronisation burst would be located if the frame were a SCH frame. The TCH multiframe equals 26 TDMA frames and the BCCH/CCCH multiframe equals 51 TDMA frames.

Since 2*26=52, the IDLE frame coincides with the CCCH frame 104 two TCH multiframes later, the FCCH frame 105 four TCH multiframes later and the SCH fame 106 six TCH multiframes later, as illustrated in FIG. 1b. Two TCH multiframes earlier the mobile station had read from the then coincident FCCH frame a frequency correction burst that indicates the location of the SCH frame. Of course, the search for the FCCH frame is carried out at every IDLE frame, not only at every second. Meanings of the designators a, c, f and s in FIGS. 1a and 1b are as follows: a=slow associated control channel SACCH, c=common control channel CCCH, f=frequency correction channel FCCH, and s=synchronisation channel SCH.

SCH frames are located in the BCCH/CCCH multiframe once in every 11 TDMA frames and otherwise at intervals of 10 TDMA frames. Once a BSIC has been found, the mobile station knows when it can be re-read without searching.

A mobile station can measure a base station's field strength during any traffic frame between the transmission and reception of a speech signal burst.

The method according to the invention requires that the frame timing differences of the neighbour base stations be determined. In a cellular network supporting pseudo-synchronous handover the frame timing differences are calculated in any case; even with an accuracy greater than what is required. Calculation of frame timing differences is based on timing measurements carried out by all mobile stations operating in the area in question and on the formula $$OTD=RTD+tb-ta \quad (1)$$

where
RTD=frame timing difference between base stations a and b
OTD=frame timing difference between base stations a and b measured by the mobile station
ta=propagation time between base station a and mobile station
tb=propagation time between base station b and mobile station.

Calculation of frame timing differences is discussed in more detail e.g. in the GSM 5.10 recommendation by ETSI (European Telecommunications Standards Institute) and in the U.S. Pat. No. 5,128,925.

Figure 2:
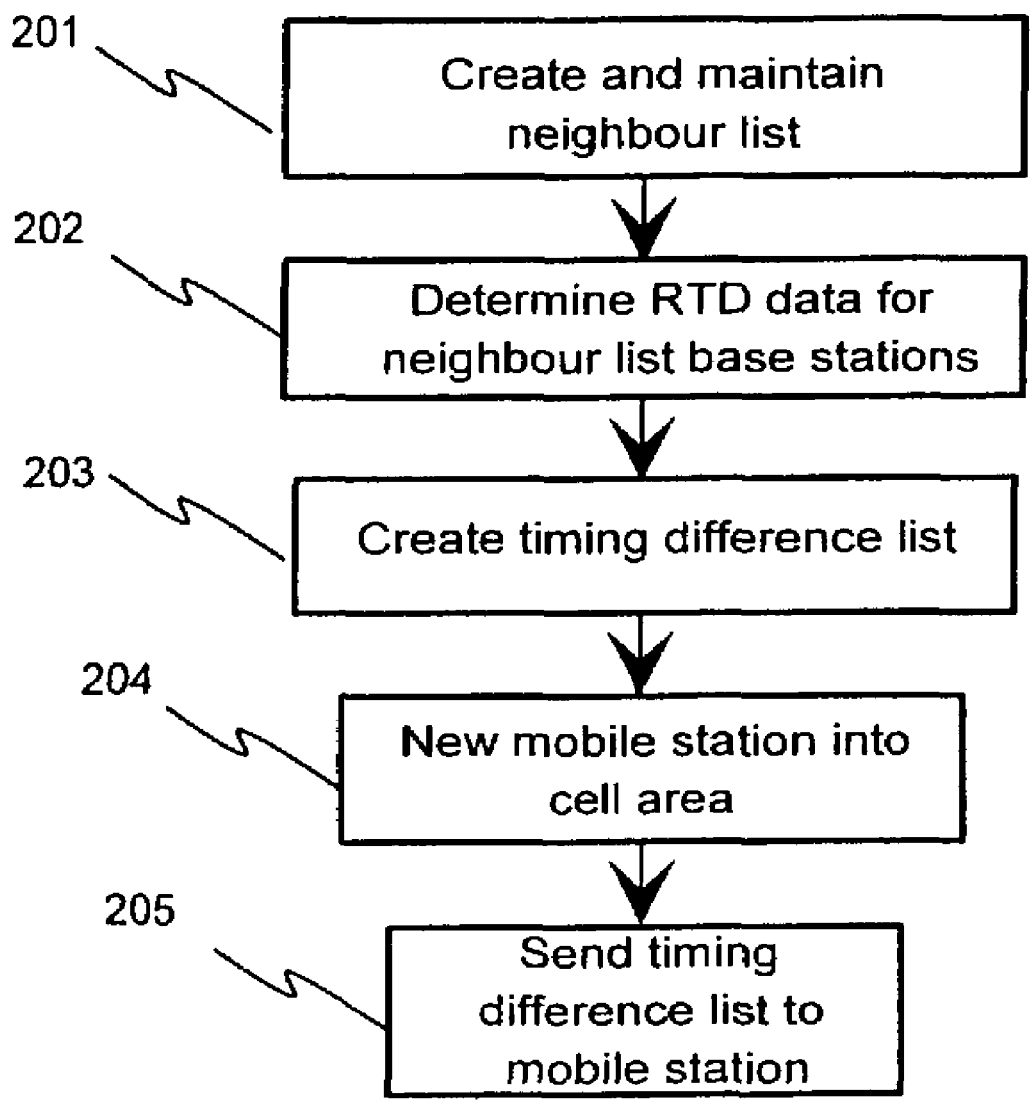
FIG. 2 is a block diagram illustrating the collection, updating and transmitting to a mobile station of base station frame timing difference data according to a first method.

The flow diagram in FIG. 2 illustrates the first method according to the invention as regards the functions of the serving base station. A neighbour list is compiled 201 for the base station. Said neighbour list contains the transmission frequency and other information for the geographical neighbour base stations of the base station. The frame timing differences RTD of the base stations included in the neighbour list are determined 202 and they are used to form 203 a frame timing difference file, or list, for the neighbour base stations. As a mobile station moves 204 from the area of a cell to the area of the serving cell, or base station, it is detected in per se known manner and the frame timing difference list of the serving cell is transmitted 205 to the mobile station. The neighbour list and at the same time the frame timing difference list may include 6 base stations or even more, currently 32 at the most.

In practice, the transmission of the frame timing difference list takes place only once, i.e. as soon as the mobile station has moved into the area of a new cell. The frame timing difference data generally remain stable during the time that the mobile station stays in a particular cell. In long calls within a cell, the data in the frame timing difference list may possibly change. Then the frame timing difference data are retransmitted, at least for the part of new cells that have not yet been identified.

If the frame timing difference data are given with the accuracy of, say, 100 μs, which is accurate enough for reading the BSIC, then the frame timing difference can be indicated using 11 bits and six frame timing difference data using 66 bits prior to channel encoding. The capacity of the slow associated control channel SACCH is 542 bit/s. SACCH is very little used in the downlink direction (from serving base station to mobile station) so it is highly suitable for the transmission of frame timing difference data.

It should be noted that the frame timing difference data may be given with a lower or higher accuracy than 100 μs. It is a compromise between the number of bits required for the transmission of timing differences and the advantage gained by the mobile phone. Higher accuracy requires a bigger IDLE frame of the mobile phone, which leads to requirements for higher speed of the synthesiser or, alternatively, the mobile phone has to search for the BSIC in the area of two IDLE frames instead of one on the basis of the timing information given.

Figure 3:
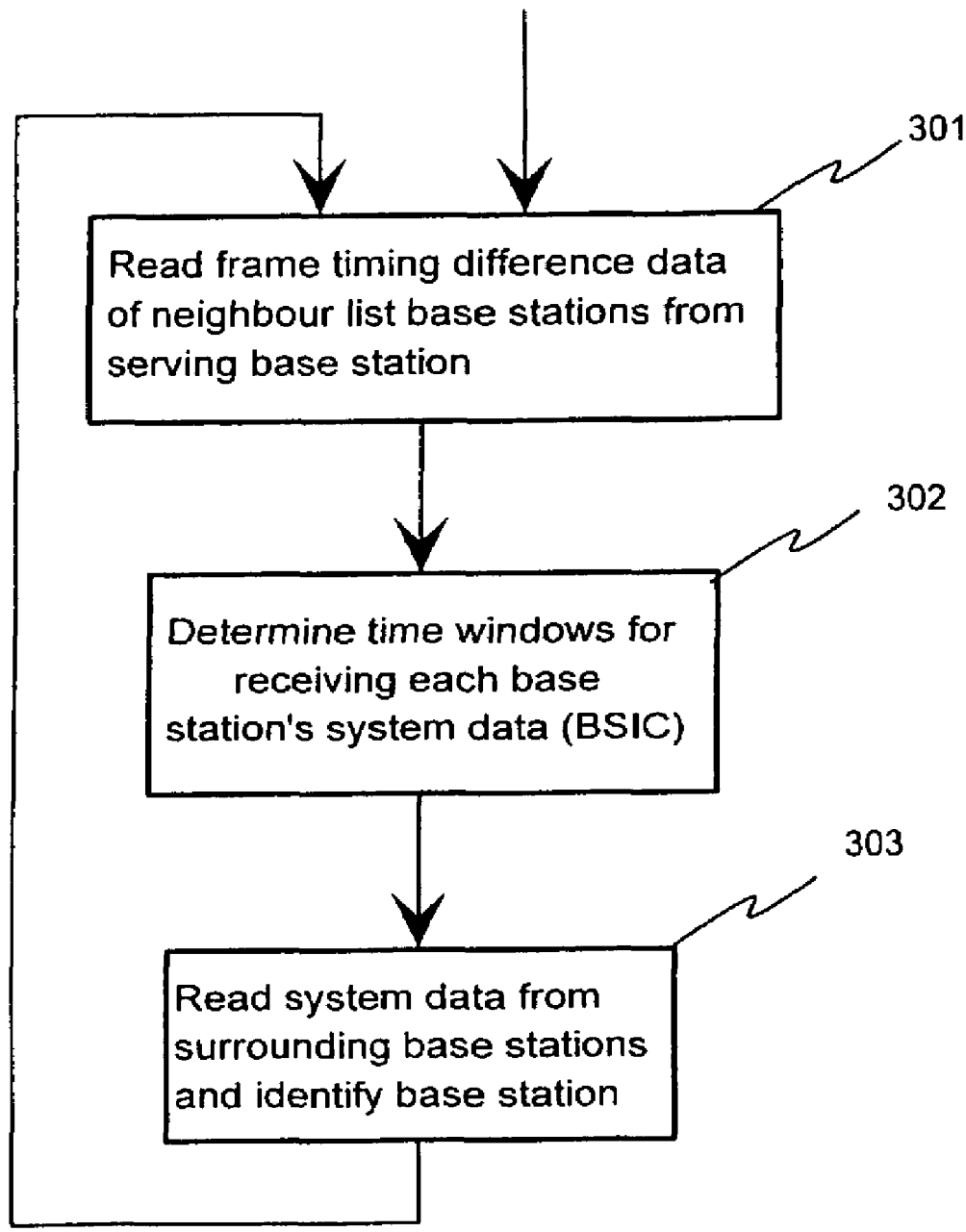
FIG. 3 shows in the form of block diagram the reception in a mobile station of system data, especially identification codes, of neighbour base stations according to the first method.

The flow diagram of FIG. 3 illustrates the first method according to the invention as regards the functions of the mobile station. The mobile station receives via its RF receiver and suitable processing units in step 301 a frame timing difference list from the serving base station. On the basis of these frame timing difference data the mobile station determines in step 302 in its control unit, for example, the time windows in which the system data of each neighbour base station can be received.

Then it is advantageously used the formula (1) according to which it is determined the frame timing differences of the mobile station and base station, and furthermore, in this embodiment, the time window in which the BSIC sent by each of the base stations on the neighbour list can be read. Then it is usually calculated in the mobile station which IDLE frame is the one that coincides with the BSIC sent by each base station. On the basis of these data the mobile station reads in step 303 the base stations' BSICs and/or possible other system data.

Figure 4:
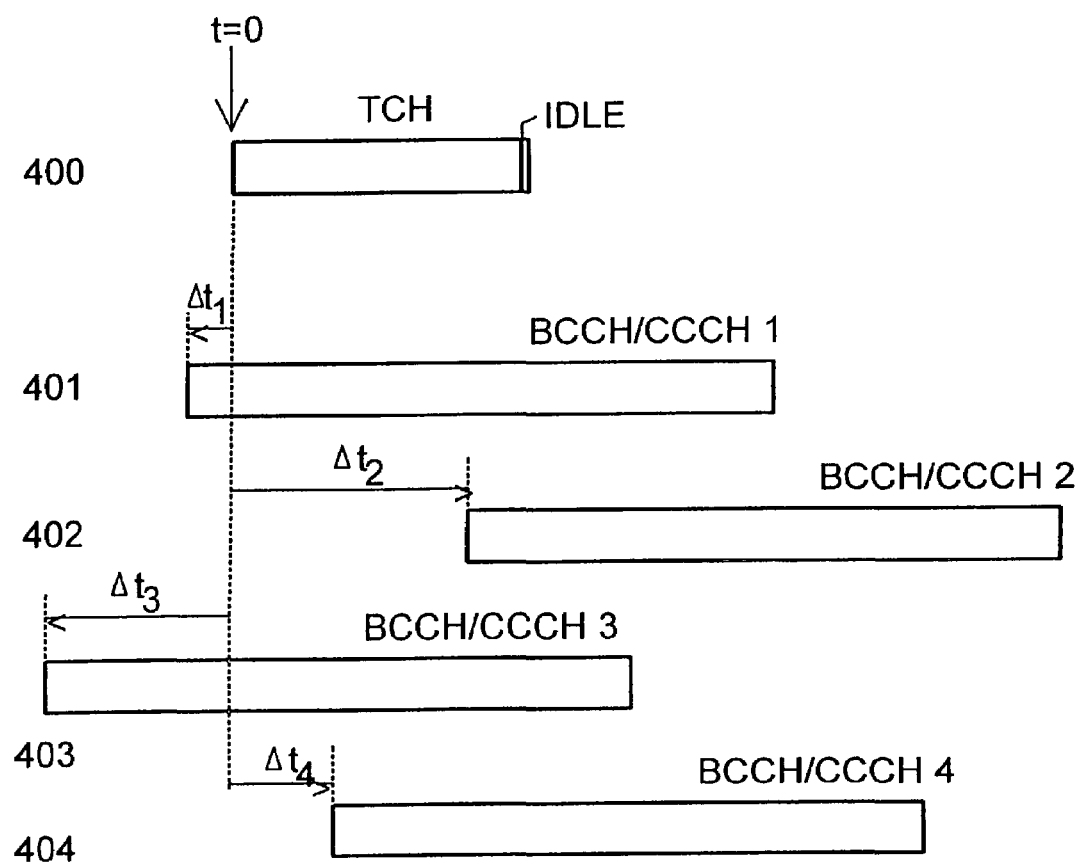
FIG. 4 illustrates the reading of identification codes of new neighbour base stations.

FIG. 4 illustrates the process for defining the moment of reading the identification data, especially the BSIC, of new base stations with respect to IDLE frames. Let us assume that the mobile station has been moved into the area of a new serving base station and the base station has transmitted to the mobile station a new neighbour list and frame timing difference list. In this example, the frame timing difference list has four new base stations 401, 402, 403, 404. On the basis of the frame timing difference list the mobile station calculates the timing differences of its own TCH multiframe 400, chosen as reference, and those of the TCH/CCCH multiframes of the new neighbour base stations 401, 402, 403, 404. Let us assume values for these frame timing differences as follows:

$\Delta t1=-19.9$ ms
$\Delta t2=+96.3$ ms
$\Delta t3=-74.5$ ms
$\Delta t4=+27.1$ ms A negative value in the table above means that the TCH/CCCH multiframe received from the base station 403 in question starts earlier than the TCH multiframe 400 used for reference. Since the duration of a TDMA frame is 4.615 ms, we get the following table for sensible use of IDLE frames:

| Base station | FC | Number of IDLE frame BSIC |
|---|---|---|
| 401 | 3 | 5 |
| 402 | 2 | 4 |
| 403 | 8 | 10 |
| 404 | (3)→14 | (5)→16 |

The number of IDLE frame indicates the number of the IDLE frame, counted from the moment t=0, that one must use in order to achieve alignment with the (frequency correction burst FC or) BSIC for the first time.

The first FC burst and BSIC of the base stations 401 and 404 happen to coincide with the same IDLE frames and, therefore, the next correct IDLE frame will be calculated for one of them, in this case for base station 404. When using IDLE frames according to the table, no IDLE frame capacity will be lost; the rest of the IDLE frames are available for the BSIC checks of the old base stations. Let it be emphasised that in the BSIC decoding according to the invention there normally is no need at all to receive the FCCH (i.e. FC) burst.

Figure 5:
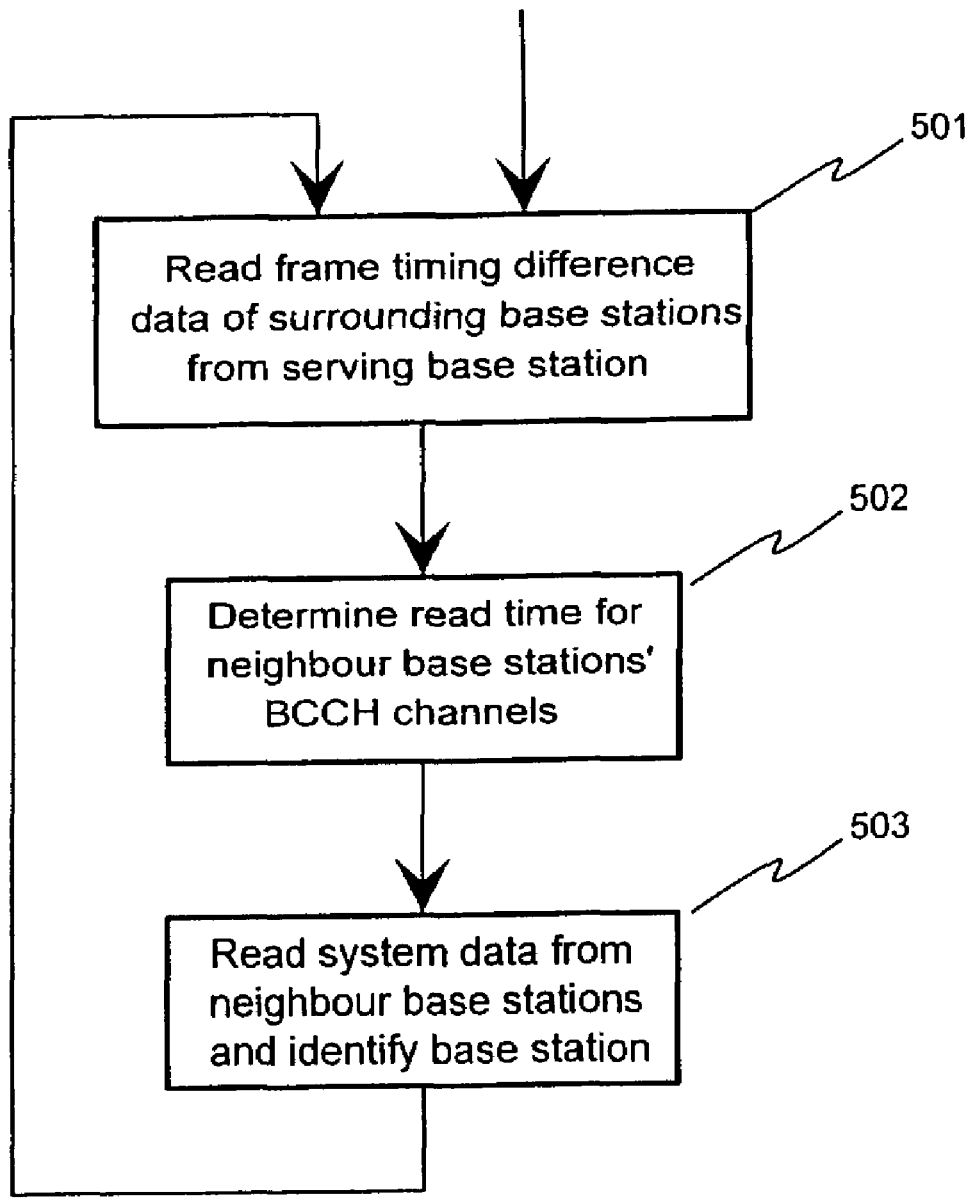
FIG. 5 shows in the form of block diagram the reception of system data, especially identification codes, of neighbour base stations in a mobile station in the idle state.

The first method according to the invention can also be applied when the mobile station is in idle state. A simple diagram in FIG. 5 illustrates the operation of such a mobile station. The serving base station makes (also) a general list of frame timing differences with the frame structures of surrounding base stations 501. This frame timing difference list typically contains the timing difference data of all the neighbour base stations, as far as they are known. The broad frame timing difference list is transmitted on the broadcast control channel BCCH or common control channel CCCH so that it can be read by all mobile stations in the area 502. A mobile station in idle state reads the list and calculates the moments of time during which the system data can be read from the different base stations 503. Then the mobile station need not separately for each base station read successive frames and wait for FCCH channels to appear. The result: reduced energy consumption.

Figure 6:
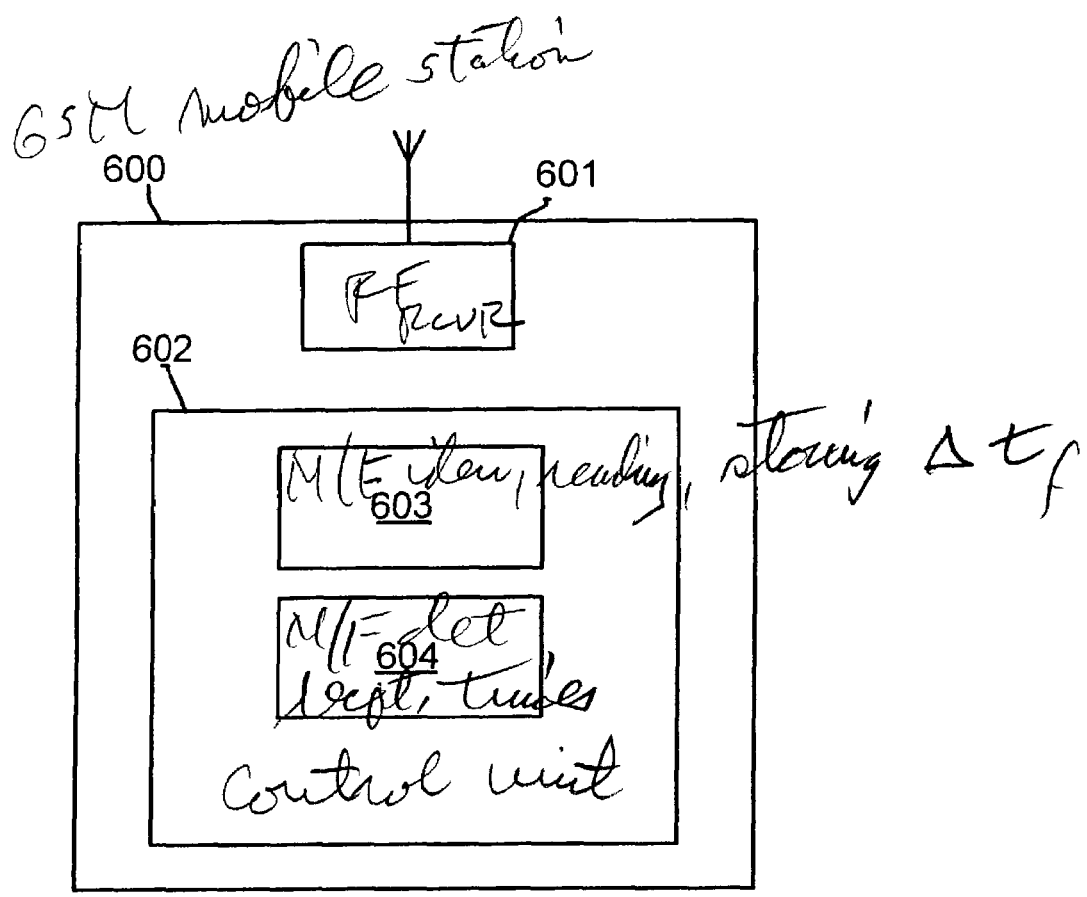
FIG. 6 shows a block diagram of a first mobile station according to the invention.

FIG. 6 illustrates a first mobile station according to the invention. It shows in the form of block diagram the GSM mobile station 600 units that are involved in the reception and processing of a frame timing difference list in accordance with the invention. A radio-frequency signal transmitted by a base station is received by means of a RF receiver 601 where it is A/D converted. The digital signal is taken to a demodulator, to be deinterleaved, and the speech information or the like is converted into sounds in an earphone (not shown in FIG. 6). These functions are controlled by a control unit 602 which processes the mobile station control information coming from the base station. Changes caused by the invention are directed to the control unit 602. It comprises in accordance with the invention means for identifying, reading and storing 603 a frame timing difference list of neighbour base stations coming from a base station, and means for determining the reception times, i.e. time windows, for the system data of a neighbour base station on the basis of the frame timing differences 604. The means 602 and 603 advantageously are software units in the control unit 602. The reception time information thus created is used in the mobile station for receiving and reading the neighbour base station system data.

The second method according to the invention for identifying base stations of a time division cellular network is applied in a cellular network employing discontinuous transmission of the broadcast control channel BCCH or transmission of the BCCH carrier wave.

Figure 7:
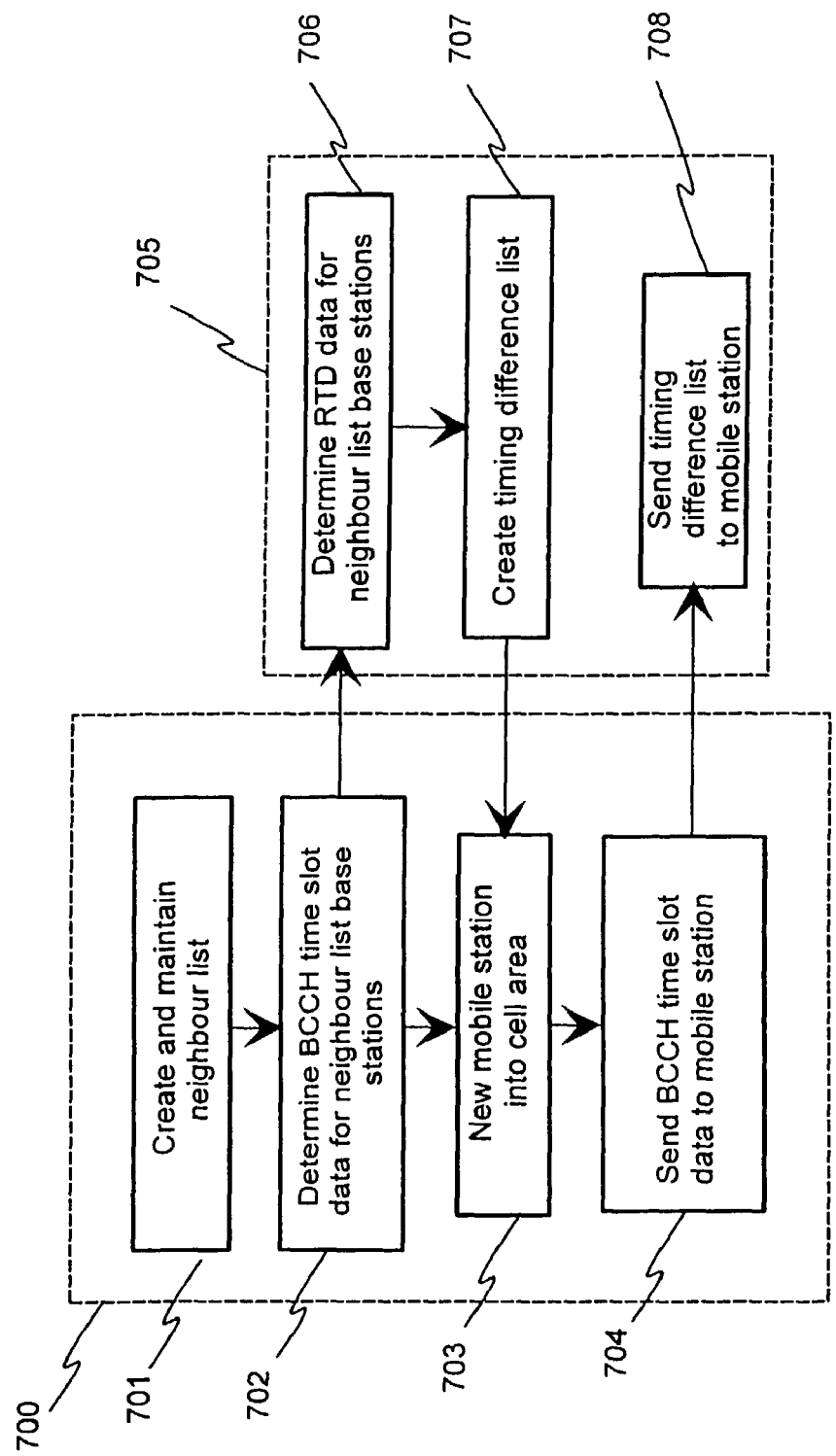
FIG. 7 is a block diagram illustrating the collection, updating and transmitting to a mobile station of base station broadcast control channel time slot data according to a second method.

The flow diagram 700 in FIG. 7 illustrates the second method according to the invention as regards the functions of the serving base station. A neighbour list is formed 701 for the base station. This neighbour list contains the transmission frequencies and other such data of the geographical neighbour base stations of the base station in question. Additionally, the neighbour base stations' broadcast control channel BCCH time slots are determined 702, i.e. it is determined in which time slots the transmission is carried out for each neighbour base station. As the mobile station moves from the area of a cell to the area of the serving cell 703, it is detected in per se known manner and the BCCH time slot data of the base stations on the neighbour list of the serving base station are transmitted to the mobile station 704. The neighbour list includes e.g. 6 base stations as described above.

The method described above can be complemented with the functions shown in diagram 705. The frame timing differences RTD of the base stations on the neighbour list are determined 706 and they are used for making the neighbour base station frame timing difference file, or list, 707. As the mobile station moves from the area of a given cell to the area of the serving cell, or base station, 703, the frame timing difference list of the serving base station will also be transmitted to the mobile station 708. The frame timing difference list is handled as described above in conjunction with the first method.

Figure 8:
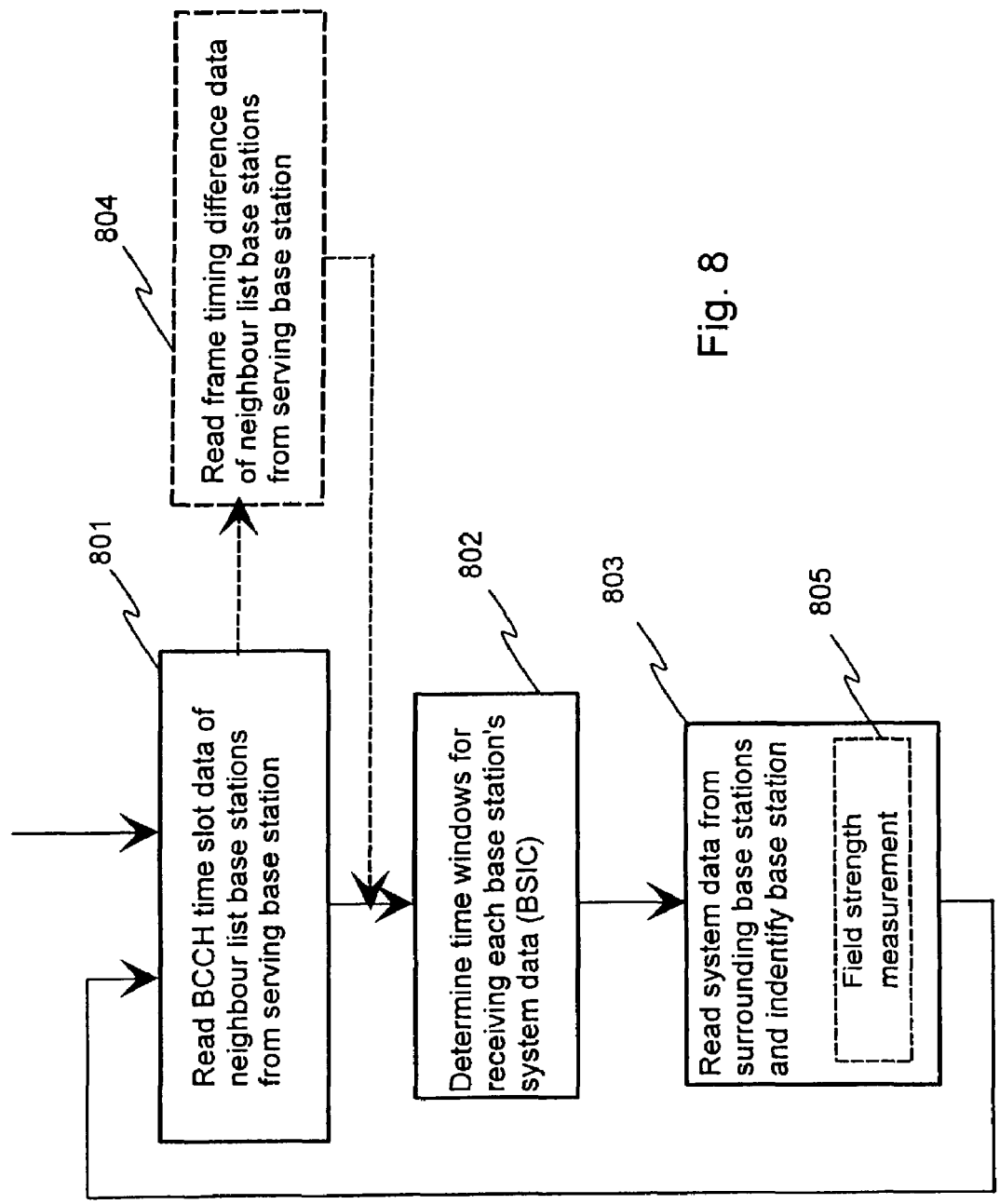
FIG. 8 shows in the form of block diagram the reception in a mobile station of system data of neighbour base stations according to the second method.

The flow diagram in FIG. 8 illustrates the second method according to the invention as regards the functions of the mobile station. The mobile station receives from the serving base station via its RF receiver and suitable processing units in step 801 the time slot data of the broadcast control channels of the base stations on the neighbour list. On the basis of these data the mobile station determines in step 802 in its control unit, for example, the time windows in which the system data of each neighbour base station can be received. On the basis of these data the mobile station reads in step 803 the base stations' BSICs and/or possible other system data.

The functions of the mobile station can be complemented with the operation indicated by a dashed line in FIG. 8. In the additional step 804 the mobile station receives from the serving base station via its RF receiver and suitable processing units a frame timing difference list. On the basis of these frame timing difference data and the broadcast control channel time slot data the mobile station determines in step 802 in its control unit, for example, the time windows in which the system data of each neighbour base station can be received. On the basis of these data the mobile station reads in step 803 the base stations' BSICs and/or possible other system data. In a preferred embodiment these system data also include the field strength measurements of the neighbour base stations.

Figure 9:
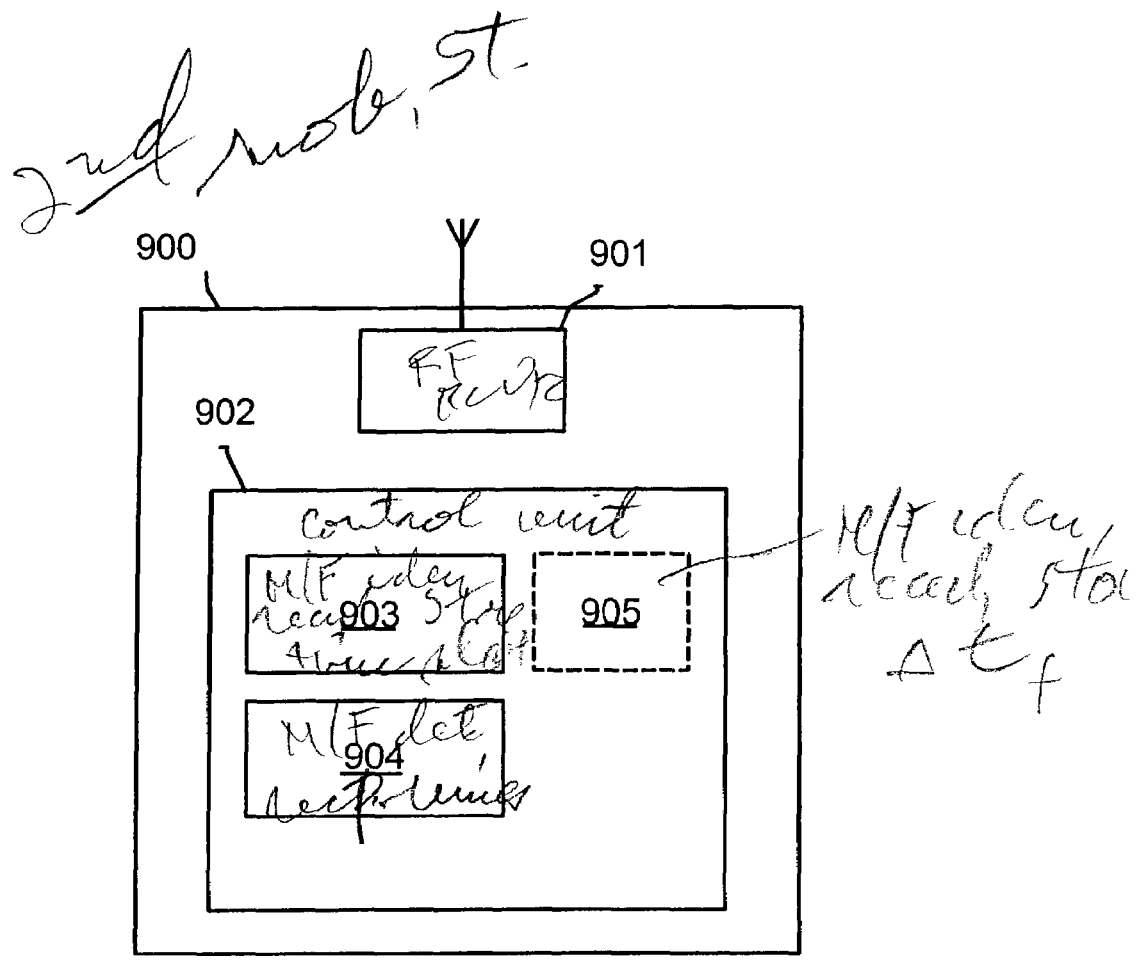
FIG. 9 shows a block diagram of a second mobile station according to the invention.

FIG. 9 illustrates in the form of block diagram the units of a second mobile station 900 according to the invention that are involved in accordance with the invention in the reception and processing of the BCCH time slot data used by the neighbour base stations. A radio-frequency signal transmitted by a base station is received by means of a RF receiver 901 where it is A/D converted. The digital signal is taken to a demodulator, to be deinterleaved, and the speech information or the like is converted into sounds in an earphone (not shown in FIG. 9). These functions are controlled by a control unit 902 which processes the mobile station control information coming from the base station. Changes caused by the invention are directed to the control unit 902. It comprises in accordance with the invention means for identifying, reading and storing 903 the BCCH time slot data of the neighbour base stations coming from the base station, and means for determining the reception times, i.e. time windows, for the system data of a neighbour base station on the basis of said BCCH time slot data 904. The means 902 and 903 advantageously are software units in the control unit 902. The reception time data thus created are used in the mobile station for receiving and reading the neighbour base station system data in principle in the same way as in a mobile station employing the first method as described above.

FIG. 9 shows in dashed lines the additional units of the mobile station 900. They can be used to complement the functions of the mobile station 900 with the additional function indicated by dashed lines in FIG. 8. The control unit 902 then comprises means for identifying, reading and storing 905 the neighbour base station frame timing difference list coming from the base station, and means for determining the reception times for the system data of a neighbour base station on the basis of the frame timing differences and BCCH time slot data 904.

Above the method and mobile station according to the invention were described mainly with reference to one preferred embodiment but it is obvious that the invention can be modified in many different ways within the scope of the claims set forth below.

The invention claimed is:

1. A mobile station comprising a control unit that includes means for identifying base stations of a time division cellular network, characterised in that said means comprises means for identifying, reading and storing a frame timing difference list for the neighbour base stations coming from a base station; and means for determining reception times for the system data of a neighbour base station on the basis of the frame timing differences.

2. The mobile station of claim 1, further comprising a radio frequency receiver coupled to said means for identifying base stations.

3. The mobile station of claim 1 wherein said means for identifying, reading and storing a frame timing difference list and said means for determining reception times each comprise software units.

* * * * *